United States Patent Office 3,475,438
Patented Oct. 28, 1969

3,475,438
PIPERIDINE DERIVATIVES OF DIBENZOBI-
CYCLO[5.1.0]OCTANE
David C. Remy, North Wales, Pa., assignor to Merck &
Co., Inc., Rahway, N.J., a corporation of New Jersey
No Drawing. Filed Aug. 24, 1967, Ser. No. 662,893
Int. Cl. C07d 29/12, 29/24, 29/16
U.S. Cl. 260—293                                    5 Claims

ABSTRACT OF THE DISCLOSURE

N-alkyl piperidine derivatives of dibenzobicyclo-[5.1.0] octane are prepared from 5H-dibenzo[a,d]cycohepten-5-one or a substituted derivative thereof. In a preferred instance 5H-dibenzo[a,d]cyclohepten-5-one is converted by treatment with sodium methoxide and ethyl trichloroacetate to 8,8-dichloro-2,3,5,6-dibenzobicyclo[5.1.0]octan-4-one which, in turn, is reduced to 8,8-dichloro-2,3,5,6-dibenzobicyclo[5.1.0]octan-4-ol with sodium borohydride. The said octanol is then reduced with lithium and t-butanol to produce 2,3,5,6-dibenzobicyclo[5.1.0]octan-4-ol followed by oxidation of said octanol with chromium trioxide and aqueous sulfuric acid to produce 2,3,5,6-dibenzobicyclo[5.1.0]octan-4-one. The ketone is then reacted with a Grignard reagent prepared from 4-chloro-1-methyl piperidine to produce 1-methyl-4-[4'-hydroxy-2',3',5',6'-dibenzobicyclo[5.1.0]oct-4'-yl]piperidine which is then dehydrated. These dibenzobicyclo[5.1.0]oct-4'-yl piperidines are useful in the treatment of condition which arise from the presence of excess scrotonin.

---

This invention relates to certain novel 2,3,5,6-dibenzobicyclo[5.1.0]octylidene compounds exemplified by the following structural formula:

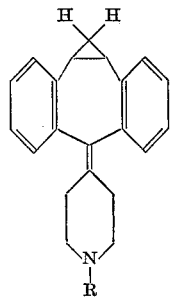

and the acid addition salts and N-oxides thereof, wherein R is a lower alkyl substituent. It also relates to new processes and intermediates employed in the preparation of these new compounds.

These new 2,3,5,6-dibenzobicyclo[5.1.0]octanes are distinguished by their ability to combat the effects of serotonin and thus are useful in the treatment of conditions which arise from the presence of excess serotonin.

This invention also relates to a process for the preparation of said 2,3,5,6-dibenzobicyclo[5.1.0]octane compounds and particularly to a process for the preparation of 1-alkyl-4-[4'-(2',3',5',6' - dibenzobicyclo[5.1.0]octylidene)]piperidine compounds. Thus, they are prepared by reaction of a 2,3,5,6 - dibenzobicyclo[5.1.0]octan - 4 - one under the conditions of a Grignard reaction with a Grignard reagent formed by the reaction of 4-chloro-1-loweralkyl piperidine with magnesium. The compound initially formed as a result of the Grignard reaction is hydrolyzed to produce the resulting tertiary carbinol, i.e., 1-loweralkyl-4-(4'-hydroxy-2',3',5',6' - dibenzobicyclo[5.1.0]oct-4'-yl)piperidine. The carbinol formed in this manner is then treated with a dehydrating agent and heated to split out the hydroxyl substituent at the 4'-position and produce the resulting octylidene compound, i.e., 1-loweralkyl-4-[4'-(2',3',5',6' - dibenzobicyclo[5.1.0]octylidene)]piperidine. These reactions are illustratively described in the following flow sheet:

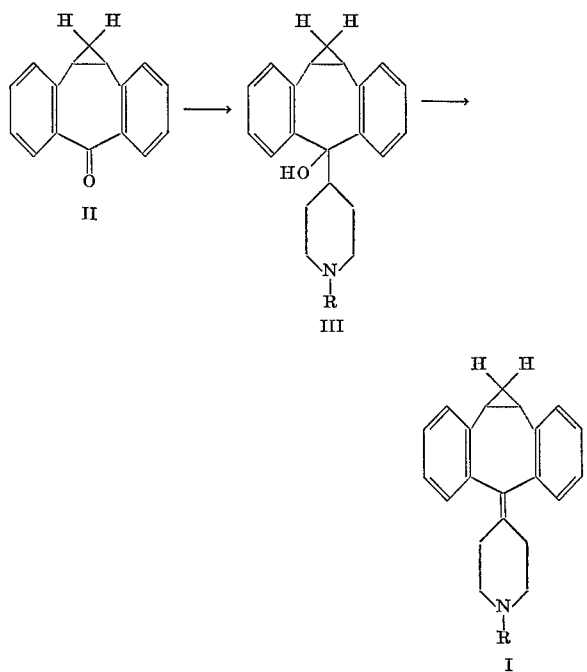

In carrying out the first step of the reaction, the Grignard reagent from 4-chloro-1-methyl piperidine is prepared by refluxing the halo compound in the presence of magnesium in a dry solvent such as tetrahydrofuran. The Grignard reagent prepared in this manner is then added under anhydrous conditions to a solution of the dibenzobicyclooctanone II dissolved in an inert dry solvent, e.g. tetrahydrofuran. The resulting adduct is recovered in crude form by first removing the solvent by evaporation under reduced pressure. The crude Grignard adduct is then dissolved in an inert solvent, typically an aromatic hydrocarbon as for example benzene. The resulting benzene solution is then cooled and the Grignard adduct hydrolyzed by treatment with small amounts of water until the benzene phase containing the major portion of hydrolyzed product is entirely clear and the inorganic salts separate as a gelatinous precipitate. The benzene phase is recovered and the precipitated salts are extracted several times with benzene, and all benzene extracts combined and chromatographed on neutral alumina followed by elution of the chromatograph column with methanol. The resulting product is obtained by crystallization after removal of the solvent.

The formed carbinol is then dehydrated by known procedures employing known dehydrating agents. Dehydrating agents which may be employed include acetyl chloride, thionyl chloride, acetic anhydride and the like. A preferred dehydrating agent is a mixture of trifluoroacetic anhydride and trifluoroacetic acid at reflux temperature. Although solvents for the carbinol such as chloroform and methylene chloride may be employed, the preferred reaction conditions employ only the dehydrating mixture, i.e., trifluoroacetic anhydride and trifluoroacetic acid. In this case, trifluoroacetic acid in addition to its role as solvent for the reaction mixture is believed to promote the dehydrating reaction.

Acid addition salts of the compounds of this invention are produced by contacting the formed octylidene compound I having the 1-alkyl piperidine substituent at the 4-position with a suitable inorganic or organic acid such as hydrochloric, sulfuric, phosphoric, maleic, benzoic, tartaric, succinic or citric acid in a suitable solvent such as a lower alkanol, for example, methanol, ethanol or isopropanol. These salts form readily at room temperature and crystallize from concentrated alcohol solutions by the addition of ethyl ether to the point of incipient cloudiness.

For obtaining the desired therapeutic effect, the compounds are administered in combination with a suitable pharmaceutical carrier in an amount of from about 1 to 250 mg. per dose to be administered from 2–4 times per day, and preferably in a unit dosage form such as a tablet or capsule. The oral route of administration is preferred.

The compounds of my invention as the free bases may also be used as neutralizing agents or precipitating agents for sensitive organic acids. Thus, they may be used in isolating acids such as penicillin present in fermentation broths. The following examples are provided as illustrative embodiments of the compounds of my invention and the invention should not be construed as being strictly limited thereto.

EXAMPLE I 1-methyl-4-(4'-hydroxy-2',3',5',6'-dibenzobicyclo[5.1.0] oct-4'-yl)piperidine Magnesium turnings (1.215 gm., 0.05 mole) were placed in a 100 ml. 3-necked flask equipped with stirrer, dropping funnel, and condenser protected by a calcium chloride drying tube. An atmosphere of dry nitrogen was maintained in the apparatus throughout the reaction. The magnesium was covered with 5 ml. of dry tetrahydrofuran and then warmed. Addition of a crystal of iodine and a few drops of 4-chloro-1-methylpiperidine initiated the reaction. 4-chloro-1-methylpiperidine (6.68 gm., 0.05 mole) and 60 ml. of dry tetrahydrofuran were added dropwise at such a rate as to maintain gentle reflux. When the addition was complete, the reaction mixture was stirred for one hour at room temperature. The Grignard solution then was filtered through a plug of glass wool into a dropping funnel. Into a 3-necked flask provided with stirrer, dropping funnel containing the Grignard solution, and condenser protected by a calcium chloride drying tube, was placed 4.00 gm. (0.0182 mole) of 2,3,5,6,-dibenzobicyclo[5.1.0]octan-4-one dissolved in 55 ml. of dry tetrahydrofuran. The flask was cooled in an ice bath and the Grignard solution was added dropwise over a period of one hour. The reaction mixture then was stirred overnight at room temperature. The bulk of the tetrahydrofuran was removed under reduced pressure from a bath at 40°. The residue was taken up in benzene, cooled in an ice bath, and the Grignard adduct hydrolyzed by dropwise addition of water until the benzene phase was clear and a stiff gelatinous precipitate remained. The benzene layer was decanted and the gelatinous precipitate was extracted with four 50 ml. portions of boiling benzene. The combined benzene phases were extracted with one 100 ml. portion and two 50 ml. portions of 0.5 M citric acid. The combined citric acid extracts were washed with benzene and then rendered very basic by addition of 10 N sodium hydroxide. The oil that precipitated was taken up in benzene and dried over magnesium sulfate. Removal of magnesium sulfate and benzene gave a viscous oil. This oil was placed on a column of neutral alumina packed in benzene. The column was washed with chloroform to remove impurities, and the product was eluted with methanol. Evaporation of the methanol under reduced pressure gave an oil that crystallized on cooling. The product was recrystallized twice from ethanol-water to give white needles, M.P. 179.5–181.5°.

*Analysis.*—Calc'd for $C_{22}H_{25}ON$: C, 82.72; H, 7.89; N, 4.38. Found: C, 82.45; H, 8.06; N, 4.54.

EXAMPLE II 1-methyl-4-[4'-(2',3',5',6'-dibenzobicyclo[5.1.0]octylidene)]piperidine hydrogen maleate 1 - methyl - 4 - [4'-hydroxy-2',3',5',6'-dibenzobicyclo-[5.1.0]oct-4'-yl]piperidine (0.179 gm., 0.56 mmole) was dissolved in 2 ml. of trifluoroacetic anhydride and 2 ml. of trifluoroacetic acid. The solution was stirred magnetically and refluxed. After refluxing 2 hours, 0.075 mg. of o-sulfobenzoic anhydride was added. The solution was refluxed for 4 days during which time an additional 10 ml. of trifluoroacetic anhydride was added. The volatile components were removed by evaporation under reduced pressure from a bath at 30° C. The residue was rendered alkaline by addition of excess 10 N sodium hydroxide and then was extracted with benzene. The benzene extract was washed with three 30 ml. portions of water and dried over magnesium sulfate. Removal of the magnesium sulfate and benzene gave 0.130 gm. of yellow oil. This oil was passed over a column of neutral alumina packed in benzene. After washing the column with benzene, the product was eluted with 50 ml. of benzene-ether (1:1). Evaporation of the benzene-ether gave 0.097 gm. of a clear oil that showed a single spot on thin layer chromatography, $R_f$:0.80 (alumina, chloroform). The base (0.097 gm., 0.322 mmole) was dissolved in 1 ml. of absolute ethanol. Maleic acid (0.0374 gm., 0.322 mmole) was added to the solution, and then ether was added to incipient cloudiness. The product crystallized slowly, M.P. 154–158°. Recrystallization gave material, M.P. 160–162°. Analysis indicated that the sample, after drying at 97° for 6 hours at 0.1 mm., contained one mole of ethanol of crystallization.

*Analysis.*—Calc'd for $C_{22}H_{23}N \cdot C_4H_4O_4 \cdot C_2H_5OH$: C, 72.54; H, 7.18. Found: C, 72.23, 72.80; H, 6.72, 6.77. The material was re-dried at 97° for 22 hours at 0.1 mm.

*Analysis.*—Calc'd for $C_{22}H_{23}N \cdot C_4H_4O_4$: C, 74.80; H, 6.52; N, 3.36. Found: C, 74.52; H, 6.82; N, 3.48.

The starting material for the preparation of the compounds of the present invention is prepared in accordance with the process described in Case 11337 starting with 5H-dibenzo[a,d]cyclohepten-5-one by first reacting said ketone under anhydrous conditions with sodium methoxide and ethyl trichloroacetate to form a dichlorodibenzobicyclo[5.1.0]octanone of the formula:

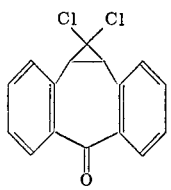

and subsequently reducing said dichloro octanone to the corresponding carbinol by treatment in solution with sodium borohydride to produce as an intermediate 8,8-dichloro - 2,3,5,6 - dibenzobicyclo[5.1.0.]octan - 4 - ol. The resulting dichlorobicyclooctanol is then treated in solution with tetrahydrofuran with lithium and tert.-butanol to reduce the dichloro compound and produce the corresponding dechlorinated octanol, i.e., 2,3,5,6-dibenzobicyclo[5.1.0.]octan-4-ol wherein the chlorine substituents have been replaced by hydrogen and oxidizing said 4-hydroxy compound with chromium trioxide in sulfuric acid to produce 2,3,5,6-dibenzobicyclo[5.1.0.]octan-4-one II.

I claim:
1. A compound having the formula:

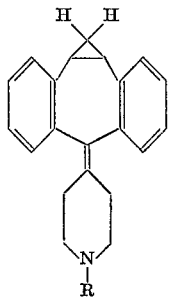

and acid addition salts and N-oxide derivatives thereof, wherein R is a loweralkyl substituent of from 1-6 carbon atoms.

2. A compound in accordance with claim 1 wherein R is a methyl substituent.

3. A compound in accordance with claim 2 comprising the maleic acid salt of 1-methyl-4-[4'-(2',3',5',6'-dibenzobicyclo[5.1.0]octylidene)]piperidine.

4. A compound having the formula:

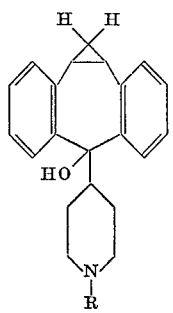

wherein R is a loweralkyl substituent having from 1-6 carbon atoms.

5. A compound in accordance with claim 4 wherein R is a methyl substituent.

References Cited

UNITED STATES PATENTS 3,014,911   12/1961   Engelhardt _____ 260—293

HENRY R. JILES, Primary Examiner

G. THOMAS TODD, Assistant Examiner

U.S. Cl. X.R.

260—294, 294.7, 590, 999